Figure 1:
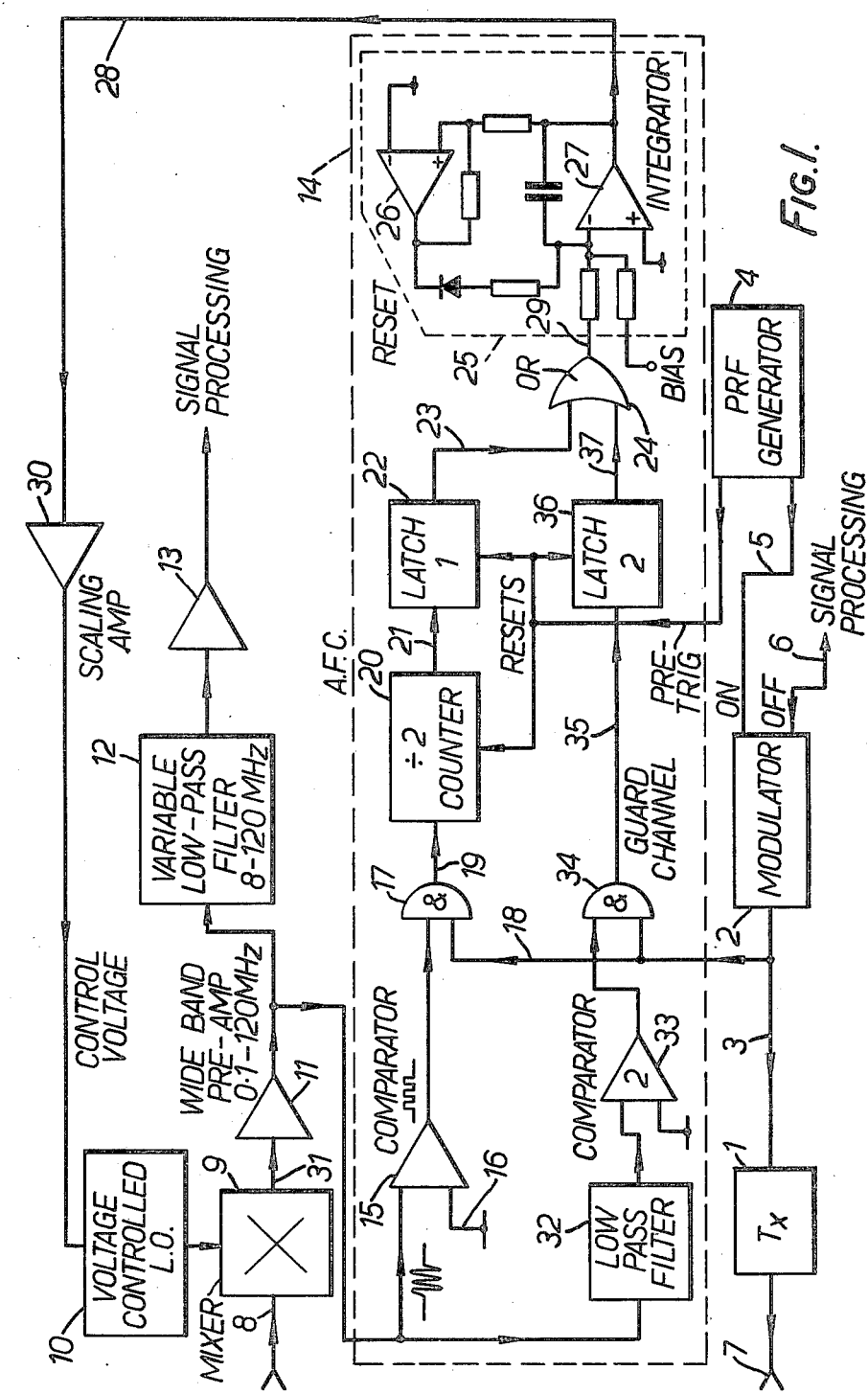

United States Patent [19]

Alder

[11] 4,179,694
[45] Dec. 18, 1979

[54] FREQUENCY CONTROL SYSTEMS

[75] Inventor: Christopher J. Alder, Emsworth, England

[73] Assignee: Plessey Handel und Investments AG, Zug, Switzerland

[21] Appl. No.: 862,186

[22] Filed: Dec. 19, 1977

[30] Foreign Application Priority Data

Dec. 21, 1976 [GB] United Kingdom ............... 53259/76

[51] Int. Cl.² ................................................ G01S 9/02
[52] U.S. Cl. .................................. 343/5 AF; 343/12 A
[58] Field of Search ........................... 343/5 AF, 12 A

[56] References Cited

U.S. PATENT DOCUMENTS 3,569,965  3/1971  Bagley ............................. 343/5 AF Primary Examiner—Maynard R. Wilbur
Assistant Examiner—Richard E. Berger
Attorney, Agent, or Firm—Fleit & Jacobson

[57] ABSTRACT

An AFC system for a radar comprising means for changing in one sense a control voltage fed to a voltage controlled local oscillator forming part of the radar receiver when a predetermined number of cycles of a difference frequency between a local oscillator and a transmitted radar frequency obtain during a predetermined period until less than the predetermined number of cycles obtain whereupon the voltage is changed in the opposite sense whereby the frequency of the local oscillator is automatically controlled.

6 Claims, 3 Drawing Figures

FREQUENCY CONTROL SYSTEMS

This invention relates to A.F.C. (Automatic Frequency Control) systems which are particularly suitable for use in radar altimeters although not exclusively for such uses and more especially it relates to radar altimeters utilising such systems.

According to the present invention an AFC system for a radar system comprises means for changing in one sense a control voltage fed to a voltage controlled local oscillator forming part of the radar receiver when a predetermined number of cycles of a difference frequency between the local oscillator frequency and the transmitted radar frequency obtain during a predetermined period until less than the said predetermined number of cycles obtain whereupon the voltage is changed in the opposite sense, whereby the frequency of the local oscillator is automatically controlled. The said predetermined period may correspond to or be derived from the period of each transmitter modulator pulse.

The system may comprise a counter responsive to the initiation of each transmitted radar pulse, a gating signal being effective to reset the counter which is arranged thereafter to begin counting pulses at the said difference frequency and a latch switch reset to one logic level together with the counter in dependence upon the initiation of each radar pulse and set to the other logic level responsively to the counter reaching the said predetermined number, and a voltage ramp generator which is arranged to feed the voltage controlled oscillator with a ramp signal which is positive going or negative going in dependence upon the state of the latch switch, whereby the frequency output of the said oscillator is automatically controlled. The said predetermined number may be two.

The counter may be fed from a mixer, which forms a part of the radar receiver and which receives the local oscillator frequency and the transmitted radar frequency (through direct leakage) to provide the difference frequency, via a threshold amplifier which is inoperative below a predetermined threshold level and a gating circuit which is arranged to be open only contemporaneously with transmitted radar pulses whereby the difference frequency between the local oscillator and direct leakage of the transmitted radar signal only is passed by the gating circuit.

The mixer may be arranged to feed the threshold amplifier via a pre-amplifier.

It will be appreciated that if the frequency of output signals from the mixer is outside the pass bandwidth of the pre-amplifier, no signals will be fed to the counter, the latch will not operate and the ramp generator will not vary its output voltage to reset the local oscillator frequency even though this operation is required. In order therefore to provide for this eventuality, a further latch may be provided which is reset together with the switch latch but in antiphase thereto to provide a logic level output which is effective to operate the ramp generator when the said further latch does not receive a signal from the pre-amplifier due for example to an input signal being outside its pass band. Signals from the pre-amplifier may be fed to the further latch via a low pass filter and a threshold detector operative to pass signals above a predetermined threshold level. The threshold detector may be arranged to feed the further latch via a gating arrangement which is opened only during the period of each modulating pulse whereby difference signals produced by echo signals mixing with the local oscillator frequency which would pass through the low pass filter and the threshold detector to the further latch are rejected.

The various parts of the system may comprise commonly utilised circuits and the integrator for example may comprise two differential amplifiers coupled so as to provide a progressively changing ramp voltage function, which automatically flies back and repeats and which tracks positively or negatively in dependence upon the sense of an applied logic level signal.

Figure 2:
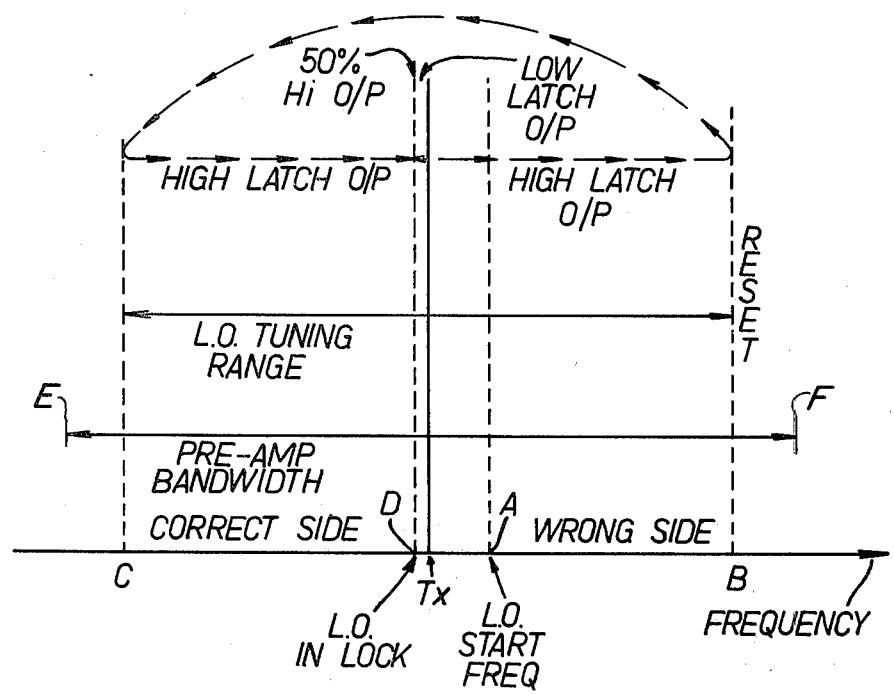
Figure 3:
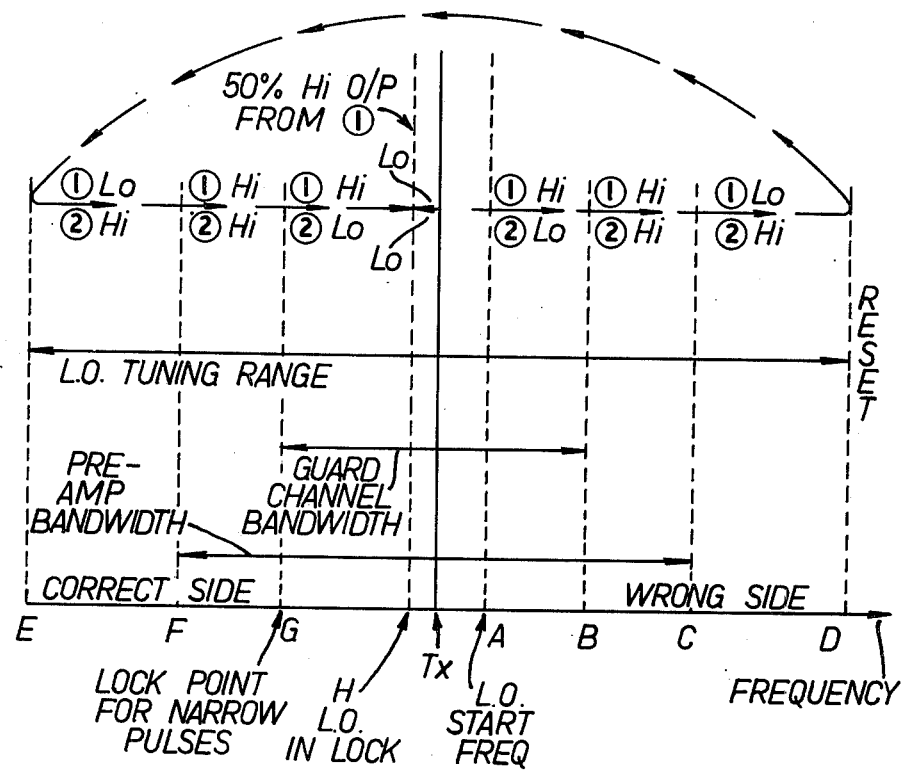

Some exemplary embodiments of the invention will now be described with reference to the accompanying drawings in which:

FIG. 1 is a block schematic diagram of part of a radar altimeter which includes an A.F.C. system, FIG. 2 is a diagram illustrating operation of the A.F.C. system described with reference to FIG. 1, and, FIG. 3 is a further diagram illustrating an alternative mode of operation of the A.F.C. system described with reference to FIG. 1.

One application of the present invention is in a J-Band pulse radar altimeter arranged to operate up to 2,500 feet. The altimeter employs a homodyne receiver (zero IF) in which the transmitter and receiver local oscillator frequencies are nominally the same. The receiver bandwidth must be wide enough to accommodate the return signal spectrum together with any offset between the transmitter and local oscillator frequencies.

At low heights the transmitted radar pulse width is very narrow, 20 n sec approximately, to prevent a direct leak between transmitter and receiver aerials from masking return echo signals from the ground. In order to accommodate the signal spectrum giving a well defined leading edge for accurate tracking, a receiver bandwidth of 120 MHz is required. The rise time of the return signal is determined by the height and the aerial beam width and is the time difference between the echo returns at vertical incidence and the echo returns at the beam edge, provided the transmitted pulse width is wider than this rise time. Hence the receiver bandwidth can be progressively decreased and the transmitted pulse width progressively increased with increasing height, so that the receiver bandwidth is matched to the return signals rise time. At high altitudes the altimeter in fact requires a transmitted pulse width of 300 n sec and a receiver bandwidth of 8 MHz enabling increased system sensitivity to be obtained due to the reduced noise band width of the receiver.

The transmitter and local oscillator are both free-running. To utilise crystal control would involve a large frequency multiplier chain with corresponding size and expense penalties. Without frequency control, difference frequencies as high as 100 MHz can be expected with age and environmental extremes, and hence a form of automatic frequency control (A.F.C.) is essential, particularly when the bandwidth is reduced to 8 MHz.

A known form of A.F.C. system for pulse radar without crystal control comprises operating at a high frequency which is sufficiently high so that the frequency discriminator bandwidth is sufficient to cope with the maximum uncontrolled frequency drift. The frequency discriminator in this case usually consists of two tuned circuits, tuned to opposite sides of the IF centre frequency. A frequency error signal is derived from the amplitude of the pulse signal from each tuned circuit. With a possible drift of 100 MHz an IF of several hundred MHz will be required. Therefore, not only would the design of a variable bandpass filter to give 8–120 MHz receiver bandwidth variation be virtually impossible, but the cost of high frequency IF strips would be considerable. Although these problems could be eased by reducing the drift with temperature compensation techniques on the transmitter and local oscillator, a means of frequency control has been devised which is preferable and which is the subject of the present invention which allows a nominal zero IF frequency to be retained thereby affording cost savings and enabling the receiver bandwidth control to be achieved with a relatively simple variable low pass filter.

Referring now to the drawing, a radar altimeter comprises a transmitter 1 arranged to transmit frequencies in the J-band and fed from a modulator 2. Modulator pulses are fed to the transmitter 1 via line 3 at approximately 30 n sec intervals the modulator pulses being between 20 and 300 n sec in length. The start of each modulator pulse is initiated by a pulse repetition frequency generator 4 which feeds the modulator 2 via line 5, the trailing edge of each modulator pulse which defines its length being controlled by processing circuits which feed the modulator via line 6, the pulse length being set in dependence upon the height as indicated by signal processing apparatus (not shown). In practice, at very low altitudes the modulator pulse width is very small, (20 n sec approximately) for reasons already mentioned, whereas at higher altitudes, in the region of 2,500 feet, the modulator pulse length is 300 n secs.

Radar pulses generated by the transmitter 1 are radiated via an aerial 7 and received echo pulses and direct leakage pulses from the transmitter are collected by a receiver aerial 8 which feeds a mixer 9. The mixer 9 is fed with a signal from a voltage controlled local oscillator 10 the frequency of which is controlled so as to be as near as possible the same as the frequency of the transmitter 1.

Control of the local oscillator is achieved by means of an A.F.C. circuit which will hereinafter be described. Output signals from the mixer which although nominally at zero IF, comprise pulse signals occupying a relatively wide frequency spectrum and these signals are therefore fed to a wide band pre-amplifier 11. The bandwidth or pass band of the amplifier 11 is between 0.1 and 120 MHz. Signals from the pre-amplifier 11 are fed to a variable low pass filter 12 which feeds signal processing apparatus via an amplifier 13. The signal processing apparatus is operative to indicate altitude in dependence upon the time at which echo signals are received after each transmitted pulse. The signal processing apparatus for performing this function is well known and since it does not directly form the subject of the present invention will not be described herein in any detail. The variable low pass filter is arranged to be variable in the range 8 to 120 MHz since at low altitudes when 20 n sec transmitted radar pulse widths are utilised a wide receiver band width is necessary, whereas at higher altitudes a smaller band width is desirable. The band width of the low pass filter 12 is therefore controlled by means not shown in dependence upon the height indicated.

The frequency of the voltage controlled local oscillator 10 is closely controlled by an A.F.C. circuit and this A.F.C. circuit is shown inside the broken line 14 and its function will now be described. Signals from the pre-amplifier 11 are fed to a threshold amplifier 15 which is arranged to pass only those signals which exceed a predetermined threshold level defined by a voltage level which is applied to the threshold amplifier on line 16. The signals fed to the threshold amplifier comprise radar echo signals and direct leakage signals corresponding to the transmitted radar pulse. In order to reject the echo signals a gate 17 is provided which is fed from the threshold amplifier 15 at one input terminal and with the modulator pulse via a line 18 at another input terminal. The gate 17 is therefore arranged to be open only when modulator signals are present and therefore only leakage signals at the transmitted radar frequency are passed to its output line 19. Signals from the line 19 are fed to a counter 20 which provides a logic '1' signal or high logic level on its output line 21 when a count of 2 is achieved. When a logic '1' signal obtains on the line 21 a latch 22 is operated to provide a logic '1' signal on its output line 23 which feeds a ramp generator via an OR gate 24. The ramp generator which is shown within the broken line 25 comprises two differential amplifiers 26 and 27 linked so as to provide on an output line 28 a progressively increasing or decreasing ramp voltage in accordance with the logic signal '1' or '0', applied to its input line 29 from the OR gate 24. When the ramp signal which obtains on line 28 and which is produced by an integrator shown within the broken line 25 reaches a predetermined limit level the integrator automatically flies back to the start of the ramp to begin progressively increasing once again. The voltage on line 28 is fed via a scaling amplifier 30 to control the frequency of the voltage controlled local oscillator 10 which includes a varactor element in its frequency determining circuit to which the ramp voltage, as scaled down, is applied.

As hereinbefore mentioned however if the frequency of the local oscillator is such that a difference frequency appearing on line 31 of the output of the mixer 9 is outside the pass band of the pre-amplifier 11, then no signals will be fed to the threshold detector 15, the counter 20 will not be incremented to 2, and the latch 22 will therefore not be operated to a logic '1'. This will have the effect that the ramp generator shown within the broken line 25 will not be operated even though the frequency of the voltage controlled local oscillator 10 is incorrect.

In order to cater for this eventuality a so-called guard channel is provided which in effect provides a logic '1' to operate the ramp generator when no signal obtains at the output of the pre-amplifier 11. This function is achieved by feeding a signal from the wide band pre-amplifier 11, via a low pass filter 32 to a further threshold amplifier 33 which is similar to the threshold amplifier 15 already described. The threshold amplifier 33 feeds a gate 34 which is similar to the gate 17 and which is open only when a modulator pulse from the modulator 2 is applied to the transmitter 1. In the absence of a signal at the output of gate 34 on line 35 a latch 36 is arranged to produce a logic '1' signal on its output line 37 which feeds the OR gate 24 and thus in the absence of an input signal to the low pass filter 32 a logic '1' signal is fed to the ramp generator shown within the broken line 25 which causes the ramp signal to be generated as required on the line 28.

In order that operation of the circuit just before described will be fully understood reference will now be made to the diagram of FIG. 2. In FIG. 2 frequency is plotted along the base line and it is assumed that the local oscillator frequency on switch-on starts at A. Since the local oscillator frequency is too high the counter 20 will count more than two cycles of the difference frequency obtaining at the output of the pre-amplifier 11 and this will result in the ramp generator shown within the broken line 25 producing a steadily increasing voltage which will change the frequency as indicated by the arrows. It will be seen that the frequency of the local oscillator increases to the point B whereat the ramp generator is arranged to fly back to a point C to start operating to increase the frequency of the local oscillator again until it reaches the point B at which the count state of the counter 20 as reached within the period of each modulating pulse, is less than 2 which has the effect of producing a logic '1' signal at the output of the latch 22 so that the voltage produced by the ramp generator shown within the broken line 25 is constrained to change in the opposite direction. The system as described works satisfactorily because as shown in the diagram of FIG. 1 the pre-amplifier band width, which lies between the points E and F, is wider than the local oscillator control range which is between the frequencies C and B.

Referring to FIG. 3, another mode of operation of the system will now be described wherein the pre-amplifier band width is less than the local oscillator tuning range which therefore requires the operation of the so-called guard channel including the latch 36 as shown in FIG. 1. Referring now to the diagram, assuming that the local oscillator start frequency is at A, then the ramp signal will be effective to increase the frequency of the local oscillator since there will be a logic '1' output from the latch 22. When frequency B is reached which corresponds to the limit of the pass band of the guard channel as defined by the low pass filter 32, a logic '1' signal will also be supplied by the latch 36 since no input signal will be fed to the latch via the gate 34. The ramp generator therefore continues past the frequency C which is the frequency band limit of the pre-amplifier 11 even though at this point the logic level output from latch 22 returns to zero. At frequency D the flyback occurs of the ramp generator shown within the broken line 25 and the frequency begins to track back from the low level limit frequency E. When the frequency F is reached which is the low frequency pass band limit of the pre-amplifier 11, the latch 22 operates once again and tracking continues until the frequency D is reached which is the low frequency band pass limit of the low pass filter 32. At this point a signal is applied via the filter 32 to the latch 36 which falls back to logic '0'. Tracking however continues until the frequency H is reached whereat the count reached by the counter 20 in each modulator pulse is less than 2. The latch 22 therefore also goes to logic '0' and the ramp generator voltage is reversed.

The latches 22 and 36 are D type flip-flops in which an input pulse will cause a change in the output which will be held until the next reset pulse. Wide band approximately 100 MHz high speed comparators are used for the threshold amplifiers 15 and 33 to provide noise immunity and to give logic compatible output pulses from the sinusoidal variations in the IF pulse. The logic employed is ECL (emitter coupled logic) due to the high frequency involved. As just before described and ignoring the so-called guard channel for the moment, the second pulses counted during each modulator pulse which are fed from the threshold amplifiers 15 and 33 result in a logic '1' output from the latch 22 and this causes the ramp generator shown within the broken line 25 to ramp downwards changing the voltage on line 28 and hence the frequency of the local oscillator 10. Now, being a homodyne system, the A.F.C. has no way of 'knowing' which side of the transmitter frequency the local oscillator is to start with. If it starts on the correct side the above change in frequency will reduce the frequency difference and hence the number of cycles counted until with only one cycle, latch 22 changes state to a logic '0' and reverses the direction of the ramp generator. Hence the difference frequency will stabilise for an average of 1½ cycles per modulator pulse. If the local oscillator starts on the wrong side of the transmitter frequency, the local oscillator will be pushed further away from the transmitter. However when the ramp signal generator reaches the threshold of a reset circuit forming a part of the ramp generator, the output voltage of the generator falls or flips back and hence the frequency is forced to the other side of the transmitter frequency so that the correct local oscillator frequency can be approached from the correct side. This operation is described with reference to FIG. 2. In this description the expression ¢zero IF" is used somewhat loosely. The frequency difference between the transmitter and the local oscillator is not held exactly at zero but to within 1½ cycles in each modulator pulse period hence the frequency difference is a function of pulse width. 1½ cycles for a 20 n sec transmitter pulse width corresponds to a frequency difference of 75 MHz but reduces to 5 MHz for a 300 n sec pulse width. Since the receiver band width is inversely proportional to the pulse width as explained earlier, the objective to ensure that the difference frequency is small enough to accommodate the return signal spectrum within the receiver band width is achieved.

The operation described above only holds provided the frequency excursion as shown in FIG. 2 is contained within the 120 MHz bandwidth of the receiver as defined by the bandwidth of the pre-amplifier 11. If not, in the case where the local oscillator frequency is initially on the wrong side of the transmitter, as the frequency is pushed out towards the reset point, the intermediate frequency will go beyond the pre-amplifier bandwidth. At this point the threshold amplifier 15 will only respond to occasional intermediate frequency pulses or parts of a pulse creating the same condition as when the automatic frequency control is correctly holding the intermediate frequency to an average of 1½ cycles. Hence a false lock arises at which the intermediate frequency is held at the cut-off frequency of the pre-amplifier 11. In a case where the local oscillator frequency is initially on the correct side but outside the pre-amplifier bandwidth no signal is received and the integrator of the voltage ramp generator discharges forcing the local oscillator frequency away from the transmitter frequency.

For a wide range automatic frequency control system, in which the tuning range is very much greater than 120 MHz, which in this case is the front end bandwidth, the so-called guard channel becomes essential. This is proceeded by the low pass filter 32 which has a cut-off frequency of about 20 MHz which is appreciably less than the remainder of the system. If the threshold detector 33 provides an output signal then the intermediate frequency is well within the pre-amplifier 11 bandwidth an output from the threshold amplifier 33 forces the latch 36 to a logic '0' and thus has no effect on the automatic frequency control. It will be appreciated that since an OR gate 24 is used, a logic '1' from one latch overrides a logic '0' from the other latch. If the local oscillator frequency is initially on the wrong side and is being pushed further away from the zero IF condition, the guard channel will stop 'seeing' the signal before the false lock can occur giving a logic '1' output. This overrides the logic '0' which will occur at the band limit from the latch 22 and forces the output of the ramp generator (shown within the broken line 25) to its reset point so as to put the frequency on the correct side. If once on the correct side the intermediate frequency is outside the pre-amplifier bandwidth, the guard channel will have the effect of forcing the frequency of its own cut-off frequency, as determined by the low pass filter 32, at which point the remainder of the automatic frequency control system takes over as just before described with reference to FIG. 3.

Thus this A.F.C. system is limited only by the running ranges determined by the ramp generator (shown within the broken line 25) and not by the frequency response of the discriminator of known automatic frequency control systems; i.e. the present automatic frequency control system has the equivalent of an infinite discriminator bandwidth.

Should either the transmitter or local oscillator fail or the automatic frequency control fail to lock on, the A.F.C. will search for the frequency since the guard channel will force the ramp generator (as shown within the broken line 25) to the reset point causing the voltage to recycle. The reset operation can be detected and used as part of the system test. As hereinbefore mentioned, the A.F.C. will hold the intermediate frequency to 75 MHz with a 20 n sec modulator pulse. This is too close to the band edge of the pre-amplifier 11 causing some of the signal spectral energy to be lost. However if the guard channel cut-off frequency is say 30 MHz, then the local oscillator frequency will be forced to an intermediate frequency of 30 MHz, i.e. the guard channel takes over for the narrower pulses holding the frequency at its cut-off frequency whilst for wider pulses the main A.F.C. channel utilising the latch 22 predominates to hold the frequency of the local oscillator at an average of 1½ cycles per modulator pulse.

The resolution of the system depends upon the number of stages in the counter 20. With no counter, the I.F. can be held to an average half a cycle per IF pulse and this may be done in a narrow band system which does not require the guard channel. With the guard channel however which gives the opposite sign output to the main channel for a "hit" (i.e. the outputs from the latches 22 and 36 are complementary) the system will always be in search. Hence the divide-by-two counter 20 is required so that whilst the guard channel responds to the first cycle, the main channel responds only to the second, the resolution may still be varied by applying a fixed bias to the voltage ramp generator as will be explained.

In a practical system a problem of transmitter "chirp" must be considered. The effect of "chirp" is to reduce the occurrence of a single cycle in the IF pulse and hence the occurrence of a logic '0' from latch 22. With no bias in the voltage ramp generator this must have an occurrence of 50% to obtain a lock. By biassing the ramp generator in favour of a logic '0' a lock can be obtained with a fewer number of single cycles. If the ramp generator bias alone is insufficient to cope with "chirp," then the automatic frequency control strobe pulse width (i.e. the pulse corresponding to the modulator pulse) can be restricted so that only part of the modulator pulse width is sampled; a part which is relatively free from "chirp." Although a narrower sampling pulse will reduce resolution this can be recovered by not resetting the A.F.C. counter and latch every transmission or biassing the integrator or the ramp generator in favour of a logic '1'.

The integrator time constant is a compromise between required lock-on time and acceptable frequency jitter. Lock-on time constant in the range of 10 to 100 n secs satisfies the requirements of an altimeter.

Various modifications may be made to the system described without departing from the scope of the invention, and it will of course be appreciated that a radar altimeter with its associated bandwidth and pulse requirements are given only as an example of one application of this type of automatic frequency control system. For example the system may be used in heretodyne systems by increasing the counter store. For example in a radar system operating with a 0.8 micro second transmitter pulse and a 60 MHz intermediate frequency, the automatic frequency control counter would be such as to stabilise the integrator for 48 cycles per modulator pulse. It will be appreciated that the accuracy is determined by the pulse width. Alternatively the system may be used to stabilise either the transmitter or local oscillator with respect to the other or against a master crystal control oscillator. The system has the advantage that effectively infinite discriminator bandwidth is achieved and that pull-in range is determined only by the oscillator tuning range. The system will stabilise the frequency for a nominal zero intermediate frequency and frequency stabilisation is achieved as opposed to frequency or phase locking. No tuned circuits are required and therefore no setting up is needed.

What is claimed is:

1. An AFC system for a radar system comprising a radar pulse transmitter, a radar echo pulse receiver including a mixer responsive to received echo signals and to transmitted pulses generated by the radar pulse transmitter, a controlled local oscillator providing a local oscillator signal for the said mixer nominally at the same carrier frequency as the said pulse transmitter so that the said receiver operates without an intermediate frequency stage, a counter, gating means operative responsively to the transmission of the radar pulse by the said pulse transmitter for passing signals derived from the said mixer to said counter and control signal producing means operative responsively to said counter reaching a predetermined count stage indicative of a frequency difference between the carrier frequency of the said radar pulse transmitter and the controlled local oscillator, for providing a control signal which is fed to the controlled oscillator so as to tend to nullify the said frequency difference.

2. An AFC system as claimed in claim 1 wherein said control signal producing means comprises latch means and ramp signal generator means, the state of the latch means being determined in dependence upon the count state of the counter and the ramp signal generator providing a control signal for said controlled local oscillator, the control signal comprising a ramp voltage which is increasing when said latch means is in a first state, and is decreasing when said latch means is in a second state.

3. An AFC system as claimed in claim 2 wherein said gating means comprises a first AND gate, and wherein said latch means comprises a first latch, a second latch, an OR gate, and means for interconnecting said first and second latch outputs to said OR gate, a first threshold detector interconnected between said mixer and said first AND gate, said counter connected to said first AND gate output and to said first latch input, a low pass filter connected to said mixer for receiving signals therefrom, a second threshold detector connected to the output of said low pass filter, a second AND gate connected to the output of said second threshold detector, means for connecting the output of said second AND gate to said second latch, wherein said OR gate provides an output signal indicative of the operative state of the latch means in dependence upon the frequency of the signals derived from the mixer in relation to the passband of the low pass filter.

4. An AFC system as claimed in claim 3 wherein said ramp signal generator means comprises two differential amplifiers and means for coupling said two differential amplifiers for providing a progressively changing ramp voltage which automatically flies back and repeats and which increases and decreases in accordance with the logic level output from said OR gate.

5. An AFC system as claimed in claim 4 wherein signals from the mixer are fed via a wide band preamplifier to the said first threshold detector and to said low pass filter.

6. An AFC system as claimed in claim 5 in a radar altimeter wherein signals from the wide band preamplifier are fed to a data signal processor means providing an indication of altitude in dependence upon the time between the transmitted radar pulse and a received echo pulse.

* * * * *